United States Patent [19]

Brewton

[11] 4,123,584

[45] Oct. 31, 1978

[54] METHOD FOR RECLAIMING PROCESSED THERMOSETTING PLASTIC COMPOUNDS

[75] Inventor: Lee K. Brewton, Carrollton, Ga.

[73] Assignee: Southwire Company, Carrollton, Ga.

[21] Appl. No.: 763,783

[22] Filed: Jan. 31, 1977

[51] Int. Cl.² .................... B44D 1/42; B29H 19/00
[52] U.S. Cl. .................... 428/379; 174/110 PM; 260/2.3; 264/37; 264/174; 264/176 R
[58] Field of Search ............. 264/37, 174, DIG. 69, 264/176 R; 174/110 PM; 428/379; 260/2.3

[56] References Cited

U.S. PATENT DOCUMENTS

| | | | |
|---|---|---|---|
| B 329,816 | 1/1975 | Cook | 264/176 R |
| 2,624,514 | 1/1953 | Wilhousky | 264/319 |
| 2,857,624 | 10/1958 | Hanzel et al. | 264/141 |
| 3,140,279 | 7/1964 | Gregorian et al. | 526/22 |
| 4,028,448 | 6/1977 | Hashimoto et al. | 264/37 |

FOREIGN PATENT DOCUMENTS 2,550,879  5/1976  Fed. Rep. of Germany ... 264/DIG. 69

*Primary Examiner*—Jay H. Woo
*Attorney, Agent, or Firm*—Herbert M. Hanegan; Stanley L. Tate; Robert S. Linne

[57] ABSTRACT

A process for recovering solid scrap thermosetting plastic compounds such as crosslinkable polyethylene compound and the like, by immediately hot-granulating the fresh thermosetting scrap before it has time to fully cure and then reducing the granules to a fine powder. The powdered scrap compound may be reused directly or blended with virgin material, and recompounded into granules for reuse in molding or extrusion processes.

8 Claims, No Drawings

METHOD FOR RECLAIMING PROCESSED THERMOSETTING PLASTIC COMPOUNDS

BACKGROUND OF THE INVENTION

The present invention relates to a process for recovering scrap plastic compounds. In particular, this invention relates to a process for recovering certain thermosetting types of plastic compounds by first hot granulating then forming a fine powder of the compound. More specifically, the present invention relates to a process for recovery of scrap crosslinkable polyethylene compounds in a useable form.

As is well known, in the processing of plastic compounds such as molding, extrusion, and the like, certain portions of the compound end up as scrap compound either in the form of rejected articles, or sprues and runners of a molding process or, in the case of most extrusion processes, as bleed from the extruder upon starting-up or shutting down. Also often large quantities of virgin material must be scrapped because it was compounded incorrectly or otherwise does not meet the specifications required for a particular use.

Industry has long recognized the value of this scrap but the issue has recently taken on new significance now that world supplies of feedstock petrochemicals are in short supply, thereby substantially raising the prices of new compound, and because of ecological pressures which now restrict the previous common means of disposal, i.e., incineration or landfill. It is also now more important to conserve the energy values represented by plastic compounds by reusing as much scrap as possible but not only as an inert filler but more desirably as a direct replacement for some of the virgin material.

Industry has generally risen to the challenge and developed various techniques to reuse some types of plastic compounds. For example, some thermoplastic types of plastic compounds can be reused simply by granulating the scrap since granules of this type of compound soften and become semi-liquid when heated during reuse so that a new and useful article can be formed by molding or extrusion or the like.

Other, more exotic, methods such as solvent recovery, have been developed for the recovery of certain specific compounds but prior art has not developed a simple and inexpensive method for reclaiming thermosetting plastic compounds. This problem remains because of the very nature of thermosetting compounds in which the application of heat during processing causes the compound to cure and become harder (i.e., "set"). Therefore attempts to simply granulate then remold a thermosetting compound have generally resulted in ineffective performance, sometimes even producing a mass of granules with little coheasion.

SUMMARY OF THE INVENTION

It is an objective of this invention to provide a process to reclaim scrap thermosetting type of plastic compounds. It is a further object to provide a scrap compound recovery process which is simple, convenient, and relatively inexpensive. Still another object of the invention is to provide a process whereby the pollution of the environment by the discarding or incineration of certain plastic compounds may be substantially abated. Still another object of this invention is to provide a product which utilizes reclaimed thermosetting compounds, thereby conserving the energy and raw materials necessary to make such products. These and other objects of the invention will become apparent in the following disclosure.

DESCRIPTION OF A PREFERRED EMBODIMENT

In accordance with this invention a process for recovering certain solid scrap thermosetting types of plastic compounds has been found which comprises the steps of first hot-granulating the fresh scrap compound before it has time to fully cure, allowing the granules to cool, thereby arresting any further curing of the compound, then further processing the granules into a fine powder. The compound may then be reused directly or blended with virgin material and remade into new granules for reuse. It has been found in the laboratory that powder reclaimed by this method shows a relatively low amount of cure as compared to "old" scrap. The size of the granules and the resulting powder is not critical in most cases, depending on the type of further processing of the scrap and the requirements of the finished article. For example, it has been found that parts made in a closed die by an injection molding process can be made from the larger sized granules directly with very little sacrifice in surface finish. The physical properties of these articles, which are usually the more important specified qualities of this type of item rather than surface smoothness, are very similar to items made from virgin material.

There are some cases where the size of the powder is somewhat critical. For example, in an extrusion process used for applying an insulating layer on an electrical conductor, it has been found that in some instances the use of powder larger than 18 mesh size causes unacceptable imperfections in the surface of the extruded plastic. In this type of application it has been found that a powder size of about 30 mesh gives superior results.

One exemplary good method of reducing the granules to powder is cryogenic grinding, however any common method known to those in the art can be used without undue experimentation.

The powder reclaimed by this process has been found to meet the same tests and specifications as virgin compound. Also finished products made from the reclaimed powder meets all industry tests and specifications as noted in the examples.

The term "thermosetting plastic compound" as used in this specification means mixtures of one or more of such types of polymers with one or more of the addition materials normally present in the fabrication of articles from this type of compound such as: pigments, stabilizers, waxes, flame retardants, ultraviolet absorbers, antioxidants, various processing aids and fillers and the like. Some specific examples of wide use are disclosed in U.S. Pat. No. 3,773,556 which is assigned to the assignee of the present invention. However, it is desired that this invention not be limited to these examples of chemically cross-linked copolymers of ethylene since other types of thermosetting plastic compounds can be used. The only requirement necessary is that the plastic compound not be entirely cured before it is reclaimed. It has been found that some compounds, even after final processing, storage and use, are not fully cured and therefore can be reclaimed by this process.

The thermosetting compounds reclaimable by this process have a variety of uses. One advantageous use is in insulation coatings for electrical conductors. An insulated electrical conductor can be formed by coating an electrically conductive material with one or more of the compounds reclaimable by this invention. The compounds can be applied by any of the industry accepted methods of applying a polymerized or polymerizable insulation coating to an electrical conductor.

An advantageous method of coating an electrical conductor with compounds reclaimed by this method is to extrude the compound, at a temperature of from about 170° F., onto an electrical conductor; then further cure the coated conductor by passing it through a continuous vulcanization tube which has an operating temperature of from about 350° to 480° F.; then cool the cured, coated electrical conductor.

Preferably scrap compound is reclaimed by this invention after the extrusion but before vulcanization. However it has also been found that insulation removed from scrap finished conductor can be reclaimed by this process if it is not completely cured, as is the usual case.

It is often preferable, especially when the compound to be reclaimed shows some amount of cure, to blend the powder produced by this invention with some amount of virgin material and then recompound the blend into new granules so that handling and conveying in further processing is facilitated. It is important to note that in this step of recompounding the reclaimed powder it is not necessary to replace any of the ingredients which were present in the initial scrap since they will perform their intended function in the now reuseable compound. However if it is necessary to change the composition of the compound from what was originally present in the scrap, for instance to form an improved compound, then additional materials may be added during the blending and recompounding by blending virgin compound, reclaimed compound, and additional materials and then forming into new granules. Therefore it is possible to carefully control the amounts of each material, thereby resulting in a superior quality product.

It has also been found that even substantially cured compound may be reused in some less exacting processes, such as injection molding and the extrusion of thick insulation coatings, if it is blended with at least 25% by weight virgin compound. When blended with more than 50% by weight virgin compound, a superior product is formed which can be reused in most processes.

The following examples are intended as further illustration of the invention but are not necessarily limitative thereof. All parts and percentages are by weight unless otherwise indicated.

EXAMPLE 1

After an extrusion process using a crosslinkable polyethylene compound was terminated, excess compound was bled from the extruder, which was at a temperature of about 175° F., and then transferred to a hot melt granulator which chopped the scrap into about ¼ inch sized particles. The granulated material was allowed to air cool. When tested in the laboratory, it unexpectedly showed a very low amount of cure with physical properties similar to virgin material.

This granulated compound was later processed into a powder smaller than 18 mesh size. The powder was then fed into an injection molding machine and processed. The finished article exhibited the necessary physical properties substantially the same as articles made from virgin compound.

EXAMPLE 2

After a crosslinkable polyethylene compound was extruded onto an electrical conductor and vulcanized at about 400° F., it was found that the product did not meet specifications and was scrapped. The insulating compound was removed from the conductor and granulated into about ¼ inch sized particles. The granulated compound was later processed into a powder which passed through an 18 mesh screen. Upon attempting to use this reclaimed powder directly in an injection molding process the compound "burned" in the machine and did not produce an article which passed the finished product tests for necessary physical properties.

EXAMPLE 3

A blend of reclaimed compounds consisting of 10% by weight of the powder from Example #2 and 90% by weight of the powder from Example #1 was evaluated and molded under the same conditions as in #1 and #2. The finished article exhibited physical properties substantially the same as the articles made from virgin compound.

EXAMPLE 4

About 100 pounds of a crosslinkable polyethylene compound was intentionally bled from an extruder during a normal production process and then granulated while still hot. At a later time these granules were reduced to a powder smaller than 18 mesh size. This powder was then blended with an equal weight of virgin material and remade into granules. This blended compound was then fed into an extruder and was used to form an insulating coating on an electrical wire. The extrusion process proceeded normally and the insulated wire passed all finished product tests exhibiting substantially the same physical properties as a wire insulated with virgin material.

In particular the finished wire passed the following standard industry tests: flame test, elongation, tensile strength, % cure, dielectric test, and a 14 day age test. In all tests the blend of reclaimed compound performed substantially the same as virgin compound.

The foregoing detailed description has been given for clarity of understanding only and no unnecessary limitations are to be understood therefrom. The invention is not limited to the exact details shown and described for obvious modifications will occur to one skilled in the art.

What is claimed is:

1. A process for utilizing reclaimed thermosetting crosslinkable polyethylene recovered from an extruder, said recovered polyethylene being fully compounded to permit re-extrusion to a final product, the steps comprising:
   a. initially extruding said fully compounded polyethylene without adding additional crosslinking agents at a temperature generally sufficient to cause crosslinking of said polyethylene, said temperature being above about 170° F. and below about 480° F.;
   b. recovering the hot polyethylene;
   c. granulating the recovered polyethylene while still warm and before it has become substantially crosslinked;
   d. cooling the granulated polyethylene to arrest further crosslinking;

e. grinding the cooled granules to a powder of about 30 mesh or less; and f. regranulating the powder suitable for extrusion use.

2. The process according to claim 1 wherein the granules formed in step (c) are about ¼ inch which are ground to a powder of about 18 mesh.

3. The process according to claim 1 wherein said powder is blended with up to about 50% fully compound virgin polyethylene prior to being regranulated for extrusion use.

4. The process according to claim 3 wherein said granules formed in step (f) are introduced into an extruder and extruded onto an electrical conductor.

5. The process according to claim 3 wherein at least 25% by weight virgin polyethylene is blended.

6. An insulated electrical conductor made in accordance with claim 4.

7. An insulated electrical conductor made in accordance with claim 5.

8. A process for reclaiming once-processed thermosetting crosslinkable polyethylene comprising the steps of:

a. initially processing fully compounded thermosetting crosslinkable polyethylene at a temperature greater than about 170° F. and below about 480° F.;

b. granulating said processed polyethylene while still warm before it is fully crosslinked;

c. powdering said granules; and d. reprocessing said powdered polyethylene without adding crosslinking agents for said polyethylene.

* * * * *